(12) United States Patent
Bates et al.

(10) Patent No.: US 6,820,236 B1
(45) Date of Patent: Nov. 16, 2004

(54) CLICK AHEAD BROWSER FUNCTION

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 09/650,501

(22) Filed: Aug. 29, 2000

(51) Int. Cl.[7] .............................................. G06F 12/16
(52) U.S. Cl. .................... 715/501.1; 715/511; 715/515; 715/526; 715/530
(58) Field of Search .......................... 715/500.1, 501.1, 715/513, 517, 518, 519, 526, 530, 506.1

(56) References Cited

U.S. PATENT DOCUMENTS

| | | | | |
|---|---|---|---|---|
| 5,801,702 A | * | 9/1998 | Dolan et al. ................. | 345/854 |
| 5,805,815 A | * | 9/1998 | Hill ............................. | 709/218 |
| 6,266,682 B1 | * | 7/2001 | LaMarca et al. .......... | 715/501.1 |
| 6,496,829 B1 | * | 12/2002 | Nakamura .................. | 707/10 |
| 6,553,393 B1 | * | 4/2003 | Eilbott et al. ............... | 715/513 |
| 6,585,777 B1 | * | 7/2003 | Ramaley et al. ............ | 715/513 |
| 6,597,377 B1 | * | 7/2003 | MacPhail .................... | 345/738 |
| 6,606,654 B1 | * | 8/2003 | Borman et al. ............. | 709/219 |

\* cited by examiner

*Primary Examiner*—Stephen S. Hong
*Assistant Examiner*—Gregory J. Vaughn
(74) *Attorney, Agent, or Firm*—Dillon & Yudell, LLP; Roy W. Truelson

(57) ABSTRACT

A method of accessing remote electronic documents, such as those stored on a network, by recording link information regarding one or more document links embedded in an electronic document, selecting the electronic document for retrieval by the computer system, and displaying the link information on a display screen, prior to downloading the electronic document. The link information is recorded at an earlier time when the electronic document had previously been loaded into the document viewer. The link information can thus be displayed concurrently with the issuance of a request for the electronic document, so the user can see the link information as the document is downloading, and can further select a link contained within the displayed link information, prior to downloading the document. The link information may include a universal resource locator (URL) address associated with one of the document links, or a java applet identifier associated with one of the links. The link information can be updated if it has changed, after downloading the current version of the document.

18 Claims, 6 Drawing Sheets

CLICK AHEAD BROWSER FUNCTION

BACKGROUND OF THE INVENTION

1. Technical Field

The present invention generally relates to computer systems, specifically to a method of accessing information that is retrieved across a network, such as the Internet, and more particularly to a method of improving the performance of browsing software in following a chain of links to a destination document, such as hypertext links for visiting pages on the World Wide Web.

2. Description of Related Art

A generalized client-server computing network 2 is shown in FIG. 1. Network 2 has several nodes or servers 4, 6, 8 and 10 which are interconnected, either directly to each other or indirectly through one of the other servers. Each server is essentially a stand-alone computer system (having one or more processors, memory devices, and communications devices), but has been adapted (programmed) for one primary purpose, that of providing information to individual users at another set of nodes, or workstation clients 12. A client is a member of a class or group of computers or computer systems that uses the services of another class or group to which it is not related. Clients 12 can also be stand-alone computer systems (like personal computers, or PCs), or "dumber" systems adapted for limited use with network 2 (like network computers, or NCs). A single, physical computer can act as both a server and a client, although this implementation occurs infrequently.

The information provided by a server can be in the form of programs which run locally on a given client 12, or in the form of data such as files that are used by other programs. Users can also communicate with each other in real-time as well as by delayed file delivery, i.e., users connected to the same server can all communicate with each other without the need for the network 2, and users at different servers, such as servers 4 and 6, can communicate with each other via network 2. The network can be local in nature, or can be further connected to other systems (not shown) as indicated with servers 8 and 10.

The construction of network 2 is also generally applicable to the Internet. In the context of a computer network such as the Internet, a client is a process (i.e., a program or task) that requests a service which is provided by another program. The client process uses the requested service without having to "know" any working details about the other program or the service itself. Based upon requests by the user, a server presents filtered electronic information to the user as server responses to the client process.

Conventional protocols and services have been established for the Internet which allow the transfer of various types of information, including electronic mail via simple mail transfer protocol (SMTP), basic file transfers via FTP (file transfer protocol), remote computing via Telnet, "gopher" searching, Usenet newsgroups, and hypertext file delivery and multimedia streaming via the World Wide Web (WWW). A given server can be dedicated to performing one of these operations, or running multiple services. Internet services are typically accessed by specifying a unique address, or universal resource locator (URL). The URL has two basic components, the protocol to be used, and the object pathname. For example, the URL of the home page for the United States Patent & Trademark Office specifies a hypertext transfer protocol ("http") and a pathname of the server. The server name is associated with a unique numeric value (a TCP/IP address, or "domain").

The present invention relates to the presentation of computer files that are distributed on a network like the Internet, but is particularly applicable to the WWW, which provides files that are conveniently linked for user access. For example, as illustrated in FIG. 2, a group 14 of files or pages 16a–16h are interrelated by providing hypertext links in each of the files (group 14 may thus be considered a typical "web site"). A hypertext link is an image or text that is viewable on the workstation's display 18, which can be selected by the user (e.g., using a pointing device or "mouse") and which then automatically instructs client workstation 12 to request another page associated with that particular hypertext link (i.e., issue another URL). A hypertext link may appear as a picture, or as a word or sentence, possibly underlined or otherwise accentuated to indicate that it is a link and not just normal, informative text.

A WWW page may have text, graphic (still) images, and even multimedia objects such as sound recordings or moving video clips. A hypertext page, if more than just text, is usually constructed by loading several separate files, e.g., the hypertext file "main.html" might include a reference to a graphic image file "picture.gif" or to a sound file "beep.wav". When a client workstation 12 sends a request to a server for a page, such as page 16a, the server first transmits (at least partially) the main hypertext file associated with the page, and then loads, either sequentially or simultaneously, the other files associated with the page. A given file may be transmitted as several separate pieces via TCP/IP protocol. The constructed page is then displayed on the workstation monitor 18 as shown in FIG. 2. A page may be "larger" than the physical size of the monitor screen (i.e., larger than the software-programmed "window" provided for viewing the page), and techniques such as scroll bars are used by the viewing software (the web browser) to view different portions of the page. Different elements of the page (e.g., picture files) may be cached within the client workstation, that is, local copies kept, to simplify reloading of those elements if the browser retrieves a page that has been previously visited.

Web pages use field-based languages such as the hypertext markup language (HTML). This language provides a protocol for transmitting formatted information and control codes used to construct the "complete" page that is ultimately displayed by the browser. Different fields within the main HTML file are defined to store the formatted information and control code parameters, using tags. Tags not only mark elements, such as text and graphics, but can also be used to construct graphical user interfaces within the web page (such as buttons that are "depressed" by selecting them using the graphical pointing device). In HTML, a tag is a pair of angle brackets (< >) that contain one or more letters and numbers between the angle brackets. One pair of angle brackets is often placed before an element, and another pair placed after, to indicate where the element begins and ends. For example, the language "<B>TODAY ONLY<\B>" uses the "B" tag to provide a boldface formatting code for the words "TODAY ONLY." Tags may also be used to label a designated area of the page while a page element (such as a picture) is being downloaded and constructed within that area.

As mentioned above, some HTML pages include references to other HTML pages by using a special HTML tag referred to as an anchor tag or link. Hypertext links provide a convenient method for reaching additional informational material. As illustrated in FIG. 2, a series of links can form a chain of pages, such as that formed by pages 16a, 16b, 16c, and 16d.

Oftentimes a user must traverse a relatively large number of pages in such a chain in order to retrieve a desired page. This procedure can take a long time, particularly if the computer or server is operating at a slower speed, or if the telecommunications lines are congested. One method of avoiding this problem is to use an electronic "bookmark" provided by the web browser, which records the network address of a desired page. In this manner, the user can select the address and proceed directly to that page without having to navigate through the path of hypertext links. Other problems arise, however, when attempting to use bookmarks. As more sites are visited, bookmark lists quickly become cluttered and more difficult to use. In the situation wherein there are several pages related to a main ("home") page of a web site, many users still prefer to bookmark the home page and then branch out from there along the various link chains to find the pages.

It is also effectively impossible to bookmark some sites, such as those which use java applets to navigate through a site's pages (java is an object-oriented programming language, and is used to program small applications, or applets, for web pages in order to enhance their presentation). These sites actually force the user to always start at the home page, which may be desired by the site owner for various reasons, including legal notices, security, or marketing. The java applets then load requested pages without providing a different (unique) URL to the browser on which to base a bookmark for a page beyond the primary/home page.

In these various situations where the desired page is to be found via a chain of several links, the user must wait an inordinate amount of time for each hypertext page to download, before the next link in the chain can be selected. Some users will attempt to utilize this time more efficiently by opening up multiple browser windows, to simultaneously process more than one page request, but oftentimes all of the browser windows are locked or suspended while one page is waiting for download completion. It would, therefore, be desirable to provide a method of allowing a user to more quickly navigate through a chain of electronic document links, such as hypertext links for pages of the World Wide Web. It would be further advantageous if a user could select the links in a "type-ahead" mode, that is, in advance of the browser even loading the page containing the link.

SUMMARY OF THE INVENTION

It is therefore one object of the present invention to provide an improved method of accessing information on a computer system.

It is another object of the present invention to provide such a method which allows a user to quickly navigate through a chain of electronic document links, such as hypertext links.

It is yet another object of the present invention to provide such a method in which the user does not need to wait for an electronic document to download prior to selecting a link that is contained in the document.

The foregoing objects are achieved in a method of accessing electronic documents, generally comprising the steps of storing, in a computer system, link information regarding one or more document links embedded in an electronic document, selecting the electronic document for retrieval by the computer system, and displaying the link information on a display screen of the computer system, prior to actually downloading the electronic document. The stored information is recorded at an earlier time when the electronic document had previously been loaded into the document viewer (e.g., web browser). In this manner, the link information can be displayed concurrently with the issuance of a request for the electronic document, so the user can see the link information as the document is downloading, and can further select a link contained within the displayed link information, prior to said downloading. The link information which is to be stored may include a universal resource locator (URL) address associated with one of the document links embedded in the electronic document, or a java applet identifier associated with one of the document links. Additional information, such as an associated link label, may also be recorded. In particular, the document layout location of each link can be stored, so that the links are positioned within the document viewer at locations that correspond to the links in the actual electronic document. The link information can be updated if it has changed, after downloading the current version of the document.

The above as well as additional objectives, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
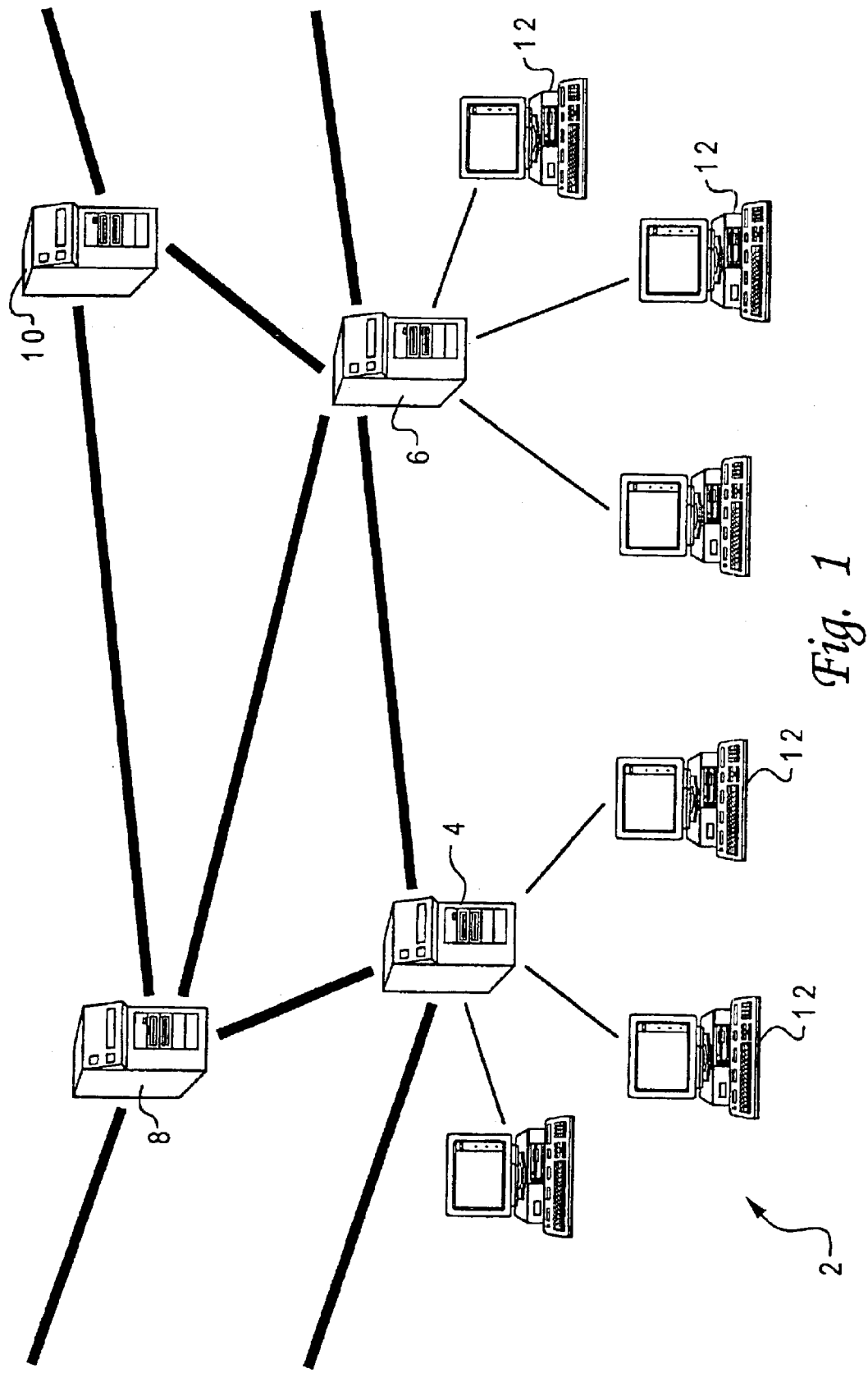
FIG. 1 is a diagram of a conventional computer network, including interconnected servers and client workstations.
Figure 2:
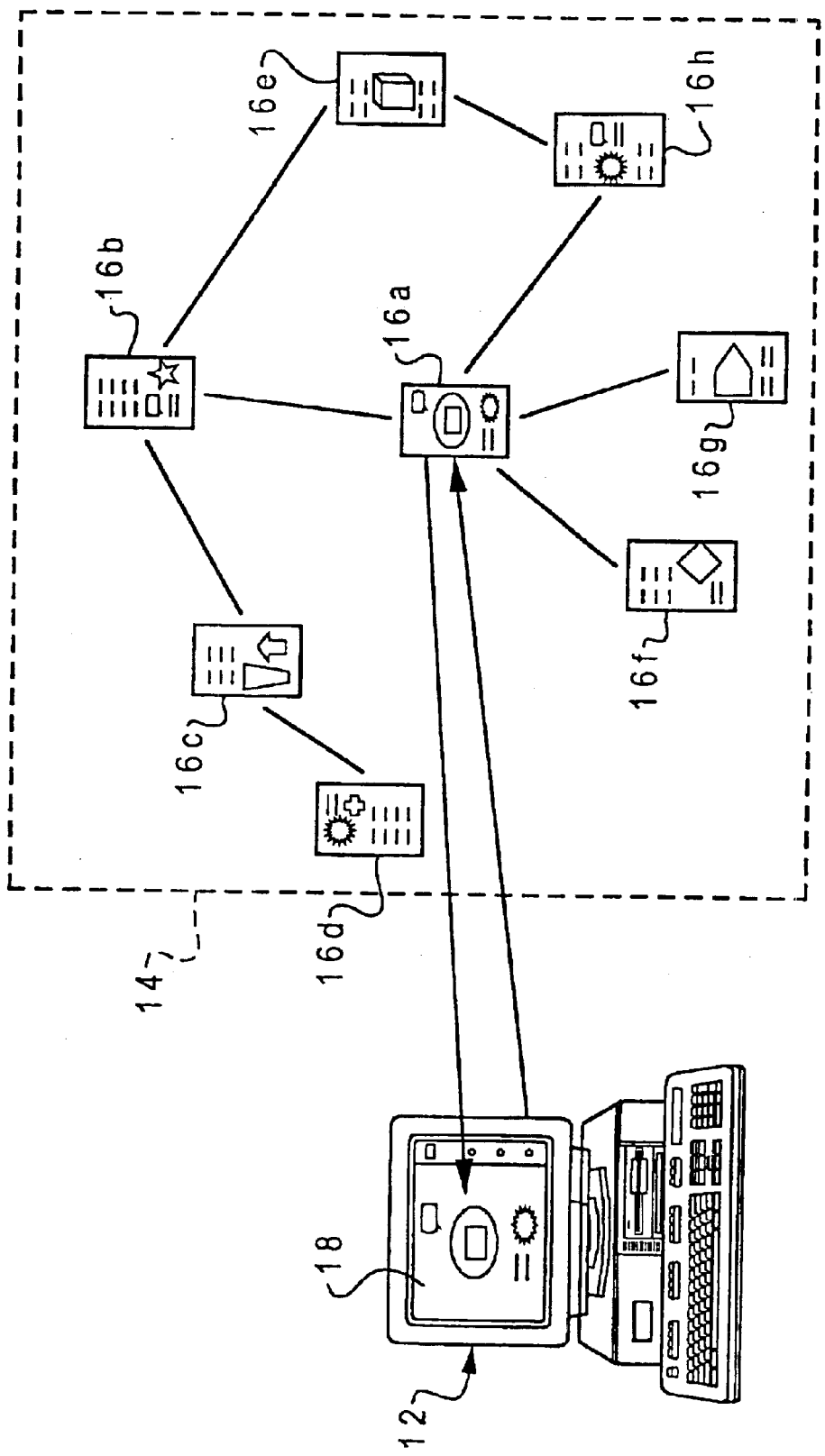
FIG. 2 is a pictorial representation of the retrieval of an object from a set of linked objects residing on the network, such as a page on the World Wide Web.

The present invention is directed to a method of accessing information that is distributed across a computer network, such as a local area network (LAN), or the Internet. While the invention may therefore be understood with reference to the network illustrated in FIG. 1, those skilled in the art will appreciate that application of the present invention is not limited to such a network. For example, the invention could also be applied to document access across a peer-to-peer network rather than a client-server network. Similarly, the present invention may be practiced using a client workstation such as a personal computer (PC), but these references should not be construed in a limiting sense.

Figure 3:
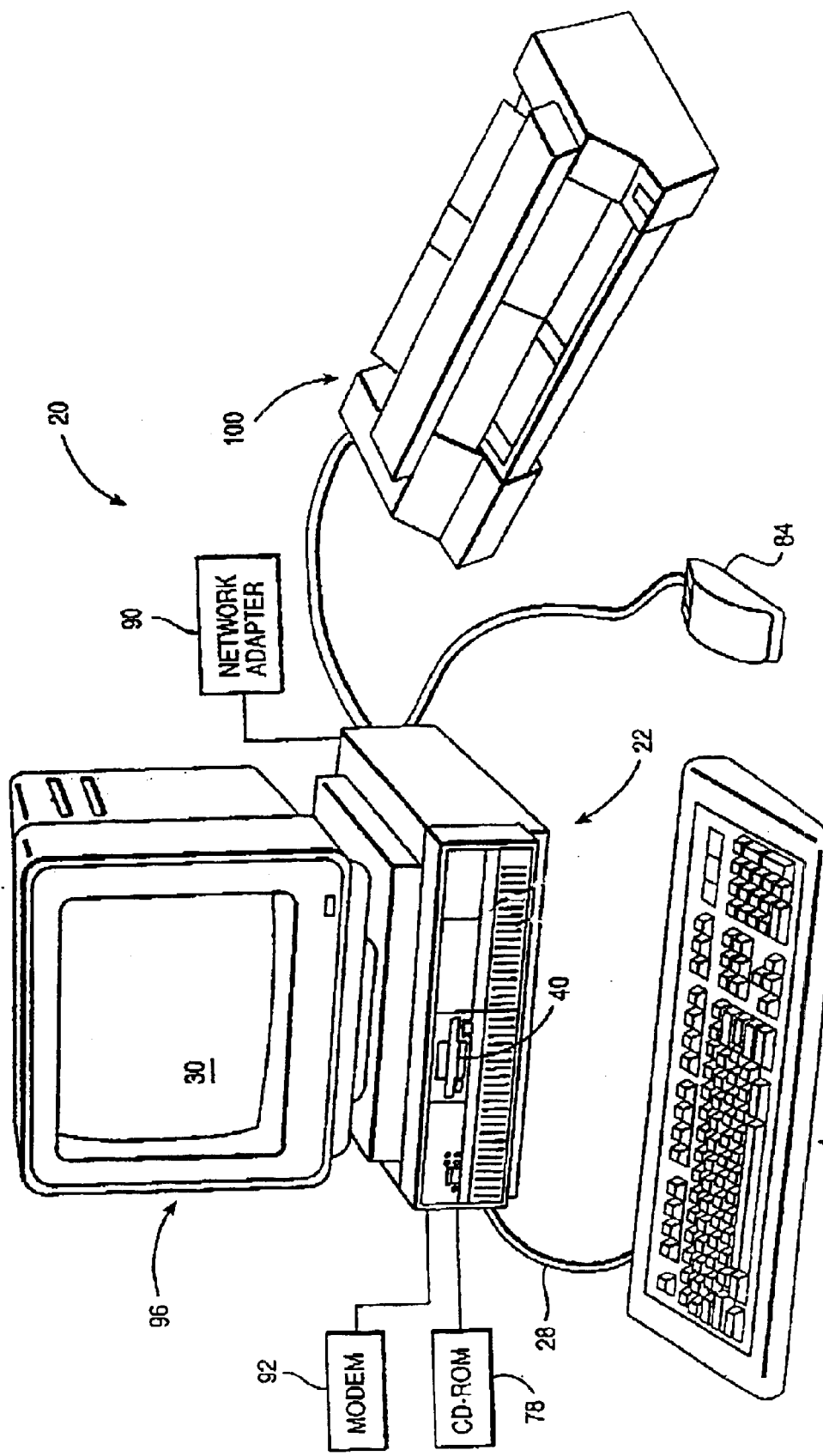
FIG. 3 is an illustration of one embodiment of a data processing system in which the present invention can be practiced.

With further reference to FIG. 3, a data processing system 20 is shown in which the present invention can be practiced. The data processing system includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

Figure 4:
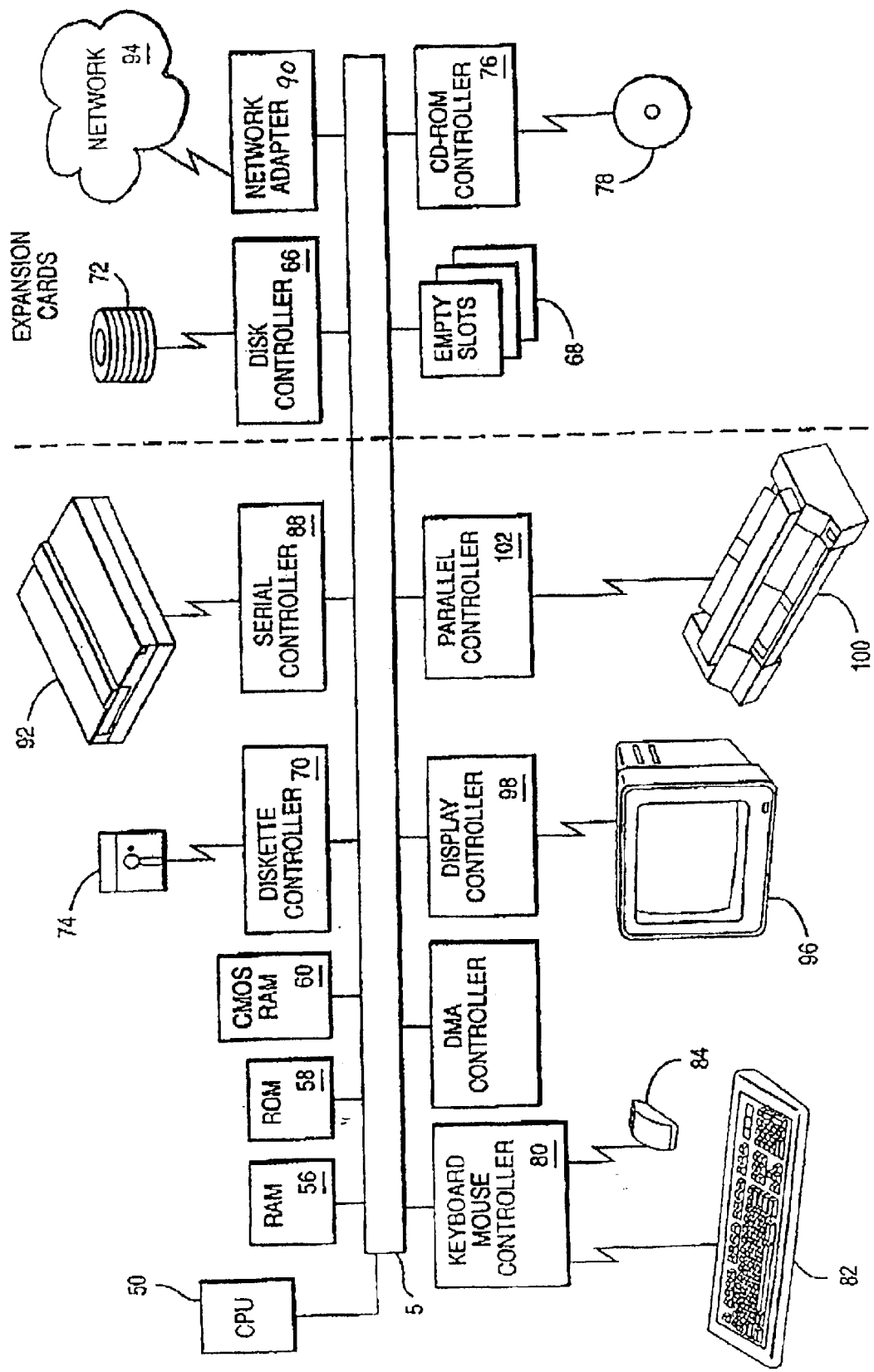
FIG. 4 is a high-level block diagram illustrating selected components that can be included in the data processing system of FIG. 3 according to the teachings of the present invention.

Reference now being made to FIG. 4, a high level block diagram is shown illustrating selected components that can be included in the data processing system 20 of FIG. 3 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 4, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface, the RS-422 interface, and the universal serial bus (USB) interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service or an Internet service provider. Such service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system via parallel controller 102. Printer 100 is used to put text or a computer-generated image (or combinations thereof) on paper or on another medium, such as a transparency sheet. Other types of printers may include an image setter, a plotter, or a film recorder. Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 4. Those skilled in the art will appreciate that a data processing system constructed in accordance with the present invention may have multiple components selected from the foregoing, including even multiple processors.

Figure 5A:
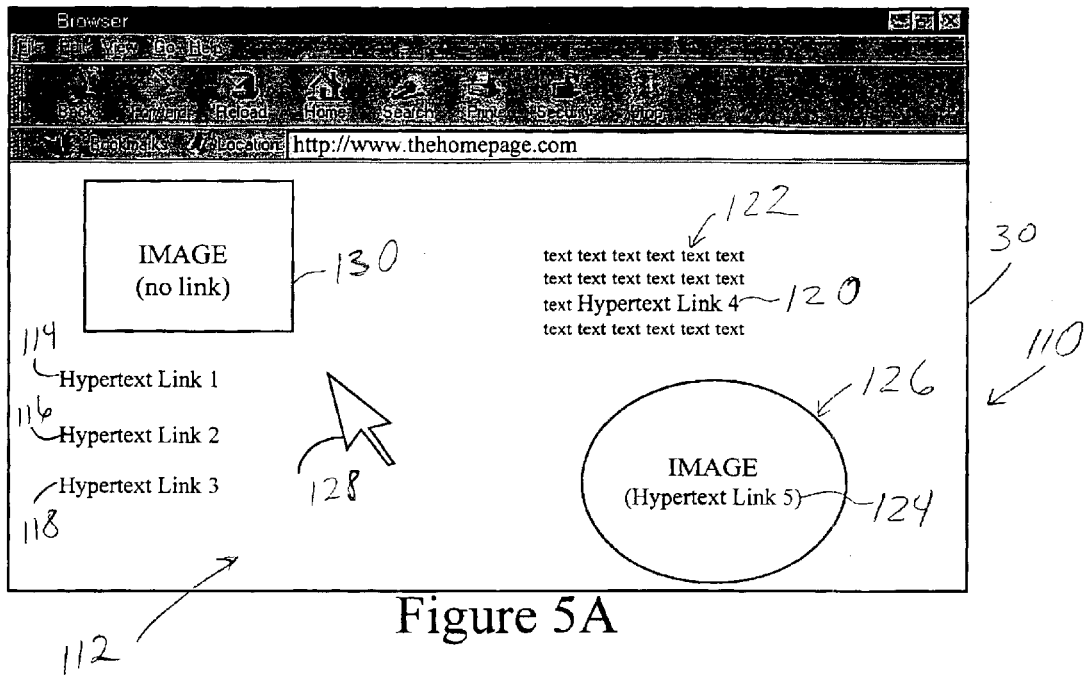
FIG. 5A is a depiction of a computer display screen showing a document viewer (web browser) which has loaded a document (web page) having multiple document links.
Figure 5B:
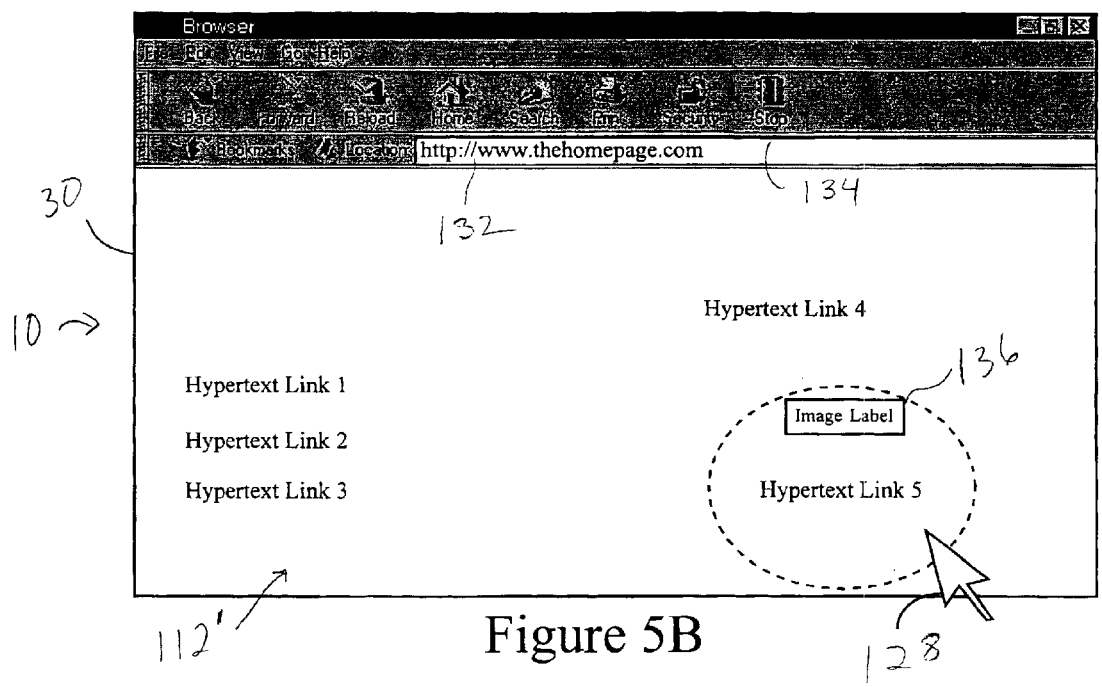
FIG. 5B is a depiction of the computer display screen of FIG. 5A in which the document viewer is displaying a previously stored version of the document which contains information on the embedded document links.

Referring now to FIGS. 5A and 5B, the present invention provides a novel method of locating and viewing documents distributed across a network, using computer system 20. Computer system 20 includes a document viewer 110 shown on display screen 30, which allows the user to more rapidly navigate through a series of linked documents in order to view a final destination document. In particular, document viewer 110 may be a web browser adapted to retrieve and display pages which contain hypertext links from the Internet. Document viewer 110, in the form of object code (a software program), may be stored in the computer system's permanent memory device 72 and loaded into RAM 56 during use. The programming details of document viewer 110 are not discussed herein, but shall become apparent to one skilled in the art upon reference to the following disclosure.

The present invention enables quicker navigation through a web site by allowing document viewer 110 to store information about pages that have previously been visited, specifically, information regarding the links that are embedded in these pages. FIG. 5A illustrates a page 112 which has been fully loaded by browser 110, and which contains five hypertext links to other documents. The first three links 114, 116 and 118 are shown in separate fields, while a fourth link 120 is embedded in a text field 122, and a fifth link 124 is embedded in an image field 126. These links may be selected using the graphical pointer 128 controlled by pointing device 84. Page 112 has other non-link features such as the static image 130. When document viewer 110 first loads page 112, it stores information regarding all five of these links. While it is only necessary to record the URL for each link, the invention preferably also records any associated label or image-related description, and the location of the link within the web page (i.e., the document layout). The link information for each page may be conveniently stored in a "visited pages" table indexed by the URL of each page.

In this manner, when the user requests page 112 at a later time, the embedded links can be presented on screen 30 before computer system 20 receives a response from network 94, as illustrated in FIG. 5B. In the snapshot image of FIG. 5B, the user has selected a hypertext link for page 112 from another document, or entered the URL of this page in the location field 132 to begin the downloading process, as indicated by the now highlighted "Stop" button 134. However, prior to receiving the current page information from the web site, and even prior to receiving any form of acknowledgment from network 94, browser 110 automatically loads a "link-only" version 112' of the original page. Page 112' includes all five of the hypertext links found in the original page, and positioned at the same respective locations. While the remainder of the page need not be displayed (e.g., the image 130 or text 122), some additional features may be shown such as an image label 136 that is associated with the fifth hypertext link 124.

The links displayed in the link-only page 112' are also selectable using graphical pointer 128, but their selection is preferably subject to verification of the link upon completion of the downloading of the current version of the actual page 112. Once the page downloads, if the link information is still valid (i.e., the same URL is associated with a link at the same location), then browser 110 proceeds with requesting the page associated with that link. This verification procedure can be performed in the background, however, so as to allow the user to select many sequential links in a series of interrelated pages prior to downloading even one page. In other words, the user may quickly jump ahead to a final destination page by selecting a series of links in different link-only pages.

Where the user has jumped ahead many pages beyond the page that is currently being downloaded by browser 110, it is not necessary to load page elements beyond the embedded links. For example, if the user has selected a link in link-only page 112' prior to the current version of that page being downloaded, then it is unnecessary to continue the download process for that page, i.e., the full data for image 126 and image 130 need not be downloaded. Indeed, there is no need to ever display the page with its full elements if a link has already been selected, and if the page elements have not been altered since the last time it was loaded. Once the user has navigated through the links to select a final destination document, the user may perform some other task while the pages download and the verifications are performed, if desired.

If a page has been altered since the last time it was loaded, it may be necessary to interrupt the navigation chain and display an altered page, particularly if the URL or location of a selected link has changed. If the only changes to a page relate to non-link information, then it is not necessary to disrupt the quick navigation procedure. Also, if link information has changed, but not with regard to a specific link that was selected in the links-only version of the page, then it is not necessary to disrupt the navigation chain since the selected link is still valid; in such a case, however, the remaining link information would be updated to reflect the current settings.

Figure 6:
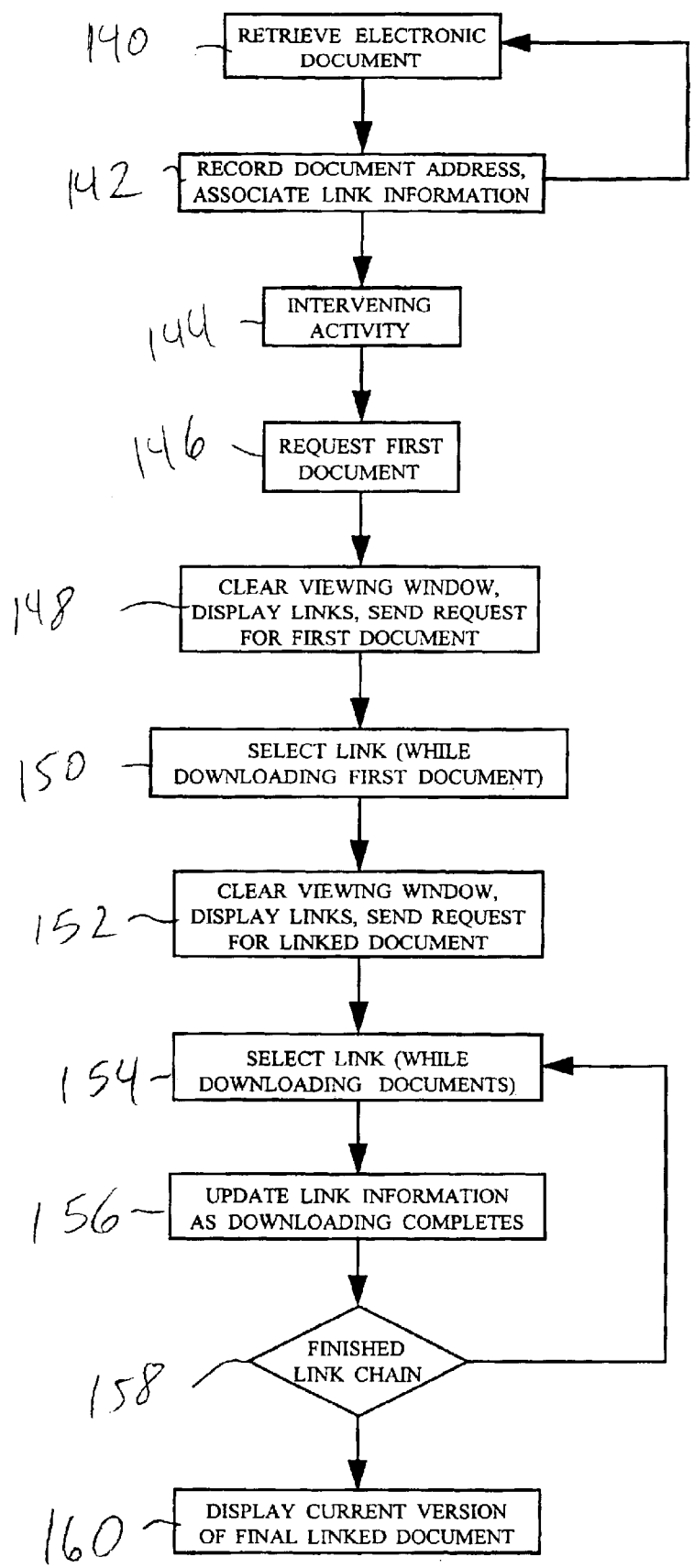
FIG. 6 is a chart depicting the logic flow according to one implementation of the present invention.

The foregoing implementation of the present invention may be further understood with reference to the flow chart of FIG. 6. The process begins when a user originally retrieves an electronic document (140). Document viewer 110 then records the document address along with the associated information on links embedded in the document (142). These steps may be repeated for many different pages. After some intervening activity (144), the user requests the same document for which link information has previously been stored (146). The browser then clears the viewing window and displays the links for the document, and sends a request for the first document to the network (148). While this first document is still downloading, the user may select one of the links in that document, as stored in the visited pages table (150). The browser again clears the viewing window and displays the links for the second requested page, and issues a request for the second document (152). Further links may be selected while downloading these documents (154), and the link information for each page can be updated as downloading progresses (156). Once the user has finished selecting all of the links in the chain (158), the current version of the final linked document is displayed after downloading (160).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention is not limited to storing a URL of a link, but is also applicable to pages which are accessed using java applets, where the links have no URL's per se. In the case where a web site is using java to control access, the name (or other identifier) of the java applet and the applet input data associated with a "link" can be recorded in lieu of a URL, and these parameters can again be utilized to allow the user to navigate through pages prior to downloading. It is therefore contemplated that such modifications can be made without departing from the spirit or scope of the present invention as defined in the appended claims.

What is claimed is:

1. A method of accessing electronic documents, comprising the steps of:

displaying a first electronic document to a user using a display screen of a computer system, said first electronic document being retrieved remotely over a network connected to said computer system;

storing, in a local storage area of said computer system, link information which is a link only version containing one or more document links embedded in an said first electronic document;

at a time subsequent to performing said displaying and storing steps, receiving a user selection selecting the first electronic document for retrieval remotely over said network by the computer system;

in response to said receiving a user selection selecting the first electronic document step, retrieving said link information from said local storage area to display the link information on a said display screen of the computer system, and issuing a request for the first electronic document to a said network connected to the computer system;

in response to displaying said link information receiving a user selection selecting a link of the displayed link information, said link identifying a second electronic document;

in response to receiving a user selection selecting a link, issuing a request for said second electronic document to said networks; and in response to said issuing a request for the first electronic document step, downloading the first electronic document;

wherein said step of issuing a request for said second electronic document is performed before said step of downloading said first electronic document.

2. The method of claim 1 wherein said storing step stores at least one universal resource locator address associated with one of the document links embedded in the electronic document.

3. The method of claim 1 wherein said storing step stores at least one java applet identifier associated with one of the document links embedded in the electronic document.

4. The method of claim 1 further comprising the step of updating the link information after said downloading step.

5. The method of claim 1 wherein said storing step stores at least one link label associated with one of the document links embedded in the electronic document.

6. The method of claim 1 wherein said storing step stores at least one document layout location associated with one of the document links embedded in the electronic document.

7. The method of claim 6 wherein said displaying step positions the one document link at the document layout location.

8. The method of claim 1 wherein said first and second electronic documents are web pages retrievable from the world wide web.

9. The method of claim 1, further comprising the steps of:

storing, in said local storage area, link information regarding one or more document links embedded in said second electronic document, said storing step being performed before said step of receiving a user selection selecting the first electronic document for retrieval;

in response to said step of receiving a user selection selecting a link identifying a second electronic document, retrieving said link information regarding one or more document links embedded in said second electronic document from said local storage area to display the retrieved link information on said display screen of the computer system;

in response to displaying said link information regarding one or more document links embedded in said second electronic document, receiving a user selection selecting a link of the displayed link information, said link identifying a third electronic document;

in response to receiving a user selection selecting a link identifying a third electronic document, issuing a request for said third electronic document to said network;

in response to said issuing a request for the second electronic document step, downloading the second electronic document;

wherein said step of issuing a request for said third electronic document is performed before said step of downloading said first electronic document.

10. A computer program product embodied as a plurality of computer readable instructions stored on a storage medium, wherein said computer readable instructions, when executed by a computer system cause the computer system to perform the steps of:

displaying a first electronic document to a user using a display screen of said computer system, said first electronic document being retrieved remotely over a network connected to said computer system;

storing, in a local storage area of said computer system, link information which is a link only version containing one or more document links embedded in an said first electronic document;

at a time subsequent to performing said displaying and storing steps, receiving a user selection selecting the first electronic document for retrieval remotely over said network by the computer system;

in response to said receiving a user selection selecting the first electronic document step, retrieving said link information from said local storage area to display the link information on a said display screen of the computer system, and issuing a request for the first electronic document to a said network connected to the computer system;

in response to displaying said link information, receiving a user selection selecting a link of the displayed link information, said link identifying a second electronic document;

in response to receiving a user selection selecting a link, issuing a request for said second electronic document to said networks; and in response to said issuing a request for the first electronic document step, receiving the downloaded first electronic document;

wherein said step of issuing a request for said second electronic document is performed before said step of receiving the downloaded first electronic document.

11. The computer program product of claim 10 wherein said storing step stores at least one universal resource locator address associated with one of the document links embedded in the electronic document.

12. The computer program product of claim 10 wherein said storing step stores at least one java applet identifier associated with one of the document links embedded in the electronic document.

13. The computer program product of claim 10 wherein said instructions further cause said computer to perform the step of updating the link information after said step of downloading the first electronic document.

14. The computer program product of claim 10 wherein said storing step stores at least one link label associated with one of the document links embedded in the electronic document.

15. The computer program product of claim 10 wherein said storing step stores at least one document layout location associated with one of the document links embedded in the electronic document.

16. The computer program product of claim 15 wherein said displaying step positions the one document link at the document layout location.

17. The computer program product of claim 10 wherein said first and second electronic documents are web pages retrievable from the world wide web.

18. The computer program product of claim 10, wherein said instruction further cause said computer to perform the steps of:

storing, in said local storage area, link information regarding one or more document links embedded in said second electronic document, said storing step being performed before said step of receiving a user selection selecting the first electronic document for retrieval;

in response to said step of receiving a user selection selecting a link identifying a second electronic document, retrieving said link information regarding one or more document links embedded in said second electronic document from said local storage area to display the retrieved link information on said display screen of the computer system;

in response to displaying said link information regarding one or more document links embedded in said second electronic document, receiving a user selection selecting a link of the displayed link information, said link identifying a third electronic document;

in response to receiving a user selection selecting a link identifying a third electronic document, issuing a request for said third electronic document to said network;

in response to said issuing a request for the second electronic document step, downloading the second electronic document;

wherein said step of issuing a request for said third electronic document is performed before said step of receiving the downloaded first electronic document.

* * * * *